United States Patent [19]
Katsuma

[11] Patent Number: 5,353,132
[45] Date of Patent: Oct. 4, 1994

[54] IMAGE PROCESSING DEVICE

[75] Inventor: Makoto Katsuma, Wako, Japan

[73] Assignee: Canon Kabushiki Kaisha, Tokyo, Japan

[21] Appl. No.: 902,558

[22] Filed: Jun. 22, 1992

Related U.S. Application Data

[63] Continuation of Ser. No. 473,458, Feb. 1, 1990, abandoned.

[30] Foreign Application Priority Data

Feb. 6, 1989 [JP] Japan .................................. 1-25750
Feb. 6, 1989 [JP] Japan .................................. 1-25751

[51] Int. Cl.⁵ .......................... H04N 1/46; H04N 1/41
[52] U.S. Cl. ................................ 358/539; 358/426; 358/261.1; 382/56
[58] Field of Search ............. 358/75, 78, 261.1, 261.2, 358/426, 430, 462, 467, 470, 500, 501, 538, 539; 382/56, 9; 364/715.02

[56] References Cited

U.S. PATENT DOCUMENTS

| | | | |
|---|---|---|---|
| 4,447,829 | 5/1984 | Schayes et al. | 358/430 |
| 4,504,972 | 3/1985 | Scherl et al. | 382/51 |
| 4,542,411 | 9/1985 | Imamaka et al. | 358/430 |
| 4,553,261 | 11/1985 | Froessl | 382/57 |
| 4,684,997 | 8/1987 | Romeo et al. | 382/56 |
| 4,903,317 | 2/1990 | Nishihara et al. | 358/426 |
| 4,959,868 | 9/1990 | Tanioka | 382/9 |
| 4,965,754 | 10/1990 | Stansfield et al. | 382/56 |
| 5,204,756 | 4/1993 | Chevion et al. | 358/462 |

FOREIGN PATENT DOCUMENTS 0096219 12/1983 European Pat. Off. ............ 358/430

Primary Examiner—Edward L. Coles, Sr.
Assistant Examiner—Thomas D. Lee
Attorney, Agent, or Firm—Fitzpatrick, Cella, Harper & Scinto

[57] ABSTRACT

The type of color image is identified on the basis of a distribution of color information for each color. A plurality of different types of data compression algorithms prepared beforehand are changed according to the results of the identification. Preferably, the difference between the maximum value and the minimum value of each picture element of respective color separation data of a color image is determined, and further, a histogram of frequency of color information obtained for each color is determined. On the basis of the histogram, the type of the color image is identified by the fact that whether or not the histogram contains a peak greater than a predetermined value or whether or not the deviation of the histogram is greater than a predetermined value.

21 Claims, 8 Drawing Sheets

IMAGE PROCESSING DEVICE

This application is a continuation of application Ser. No. 07/473,458 filed Feb. 1, 1990, now abandoned.

BACKGROUND OF THE INVENTION

This invention relates to an image processing device and particularly to an image processing device for performing image processing according to the type of color image. This kind of an image processing device is widely used in such fields as edition, registration, retrieval, communication and printing of a color image.

Color images handled by this kind of image processing device include natural images like a photograph, an illustration drawn by an illustrator (sketch image), character images centering on characters, and other kinds of images.

In the prior art, these color image data are not distinguished and are processed by a single compression/decompression algorithm.

FIG. 9 is a block diagram of a conventional image retrieval system. An input means, denoted by 100, inputs various kinds of color image data. A man-machine interface (MMI), denoted by 101, consists of a keyboard and a pointing device for the user to interact with the system. A calculation means (CPU), denoted by 102, performs logic operations for the registration and retrieval of various kinds of color image data and controls its own peripheral devices. An output means (CRT), denoted by 103, displays an image to be registered or retrieved image. A recording means, denoted by 104, stores image data in which data is compressed and an index file used for retrieving the image data. The recording means is composed of an optical disk device and a magnetic disk device. A memory, denoted by 105, has a storage area for color image data and a work area used by the CPU 102. A compression and decompression means for color image data, denoted by 106, compresses and decompresses color image data according to a single and common compression and decompression algorithm.

In the registration of images, color image data is input from the input means 100 and stored in the memory 105 once. The user inputs a key word which specifies the image by an interactive operation via the MMI 101. The CPU 102 registers the key word in the index file of the recording means 104, compresses the color image data by the compression and decompression means 106, and records this data in a corresponding place of the recording means 104.

In the retrieval of images, the user inputs a key word for retrieving an registered image by an interactive operation via the MMI 101. The CPU 102 reads out corresponding color image data from the recording means 104 according to the key word, makes the compression and decompression means 106 decompress this color image data according to an algorithm which is the reverse of the above-mentioned compression and displays a resulting image on the output means 103.

However, as in the prior art, if a compression/decompression algorithm for color image data is single, sufficient compression/decompression ratio cannot, depending on the kind (character) of image, be obtained. If the compression/decompression ratio of a certain kind of image is given a priority, the compression/decompression ratio of other kinds of images is sacrificed. If the aim is to satisfy the compression/decompression ratio of all kinds of images, the compression/decompression ratio as a whole is not increased.

In the prior art, there is a device which analyzes the characteristics of color image data. It makes a histogram for each of the color separations R, G and B.

However, in the method of making a histogram for each color separation data, since the information of the actual color specified among the color separations R, G and B is not taken into consideration, the analysis of shape made by color is difficult and the type of a color image cannot effectively be judged. If a histogram is created for each of the color separations R, G and B, processing time is lengthened and a large memory for storing histograms is needed.

The present invention removes the above-mentioned drawbacks of the prior art. An object of the present invention is to provide an image processing device capable of obtaining, depending on the type of color image, an optimum compression/decompression ratio.

Another object of the present invention is to provide an image processing device capable of identifying the type (characteristics) of color image with accuracy.

In order to achieve the above-mentioned objects in an image processing device which performs image processing according to the type of color image comprises, data compression means having a plurality of different types of data compression algorithms, identification means for identifying the type of a color image on the basis of a distribution of color information which is obtained from respective color separation data of said color image, and switching means for switching said data compression algorithms according to the identification result of said identification means.

In a preferred embodiment, an image processing device further comprises addition means for adding the information indicating the data compression algorithm switched by said switching means in compressed image data by the data compression means.

In a preferred embodiment, an image processing device further comprises storing means for storing image data compressed by said data compression means.

In order to achieve the above-mentioned objects in an image processing device which performs image processing according to the type of color image comprises, extraction means for extracting the color information of respective color separation data of said color image by computing the difference between the maximum value and the minimum value of said respective color separation data, arithmetic means for calculating a histogram of frequency of color information for each color extracted by said extraction means, and identification means for identifying the type of color image on the basis of the histogram of frequency for each color determined by said arithmetic means.

In a preferred embodiment, the identification means identifies the type of color image by the fact of whether or not said histogram of frequency for each color includes a peak greater than a predetermined value.

In a preferred embodiment, the identification means identifies the type of color image by the fact of whether or not the deviation of said histogram of frequency for each color is greater than a predetermined value.

Other features and advantages of the present invention will be apparent from the following description taken in conjunction with the accompanying drawings, in which like reference numerals designate the same or similar parts in the figures thereof.

DETAILED DESCRIPTION OF THE PREFERRED EMBODIMENT

An embodiment of the present invention will be explained in detail hereinunder with reference to the accompanying drawings.

Figure 1:
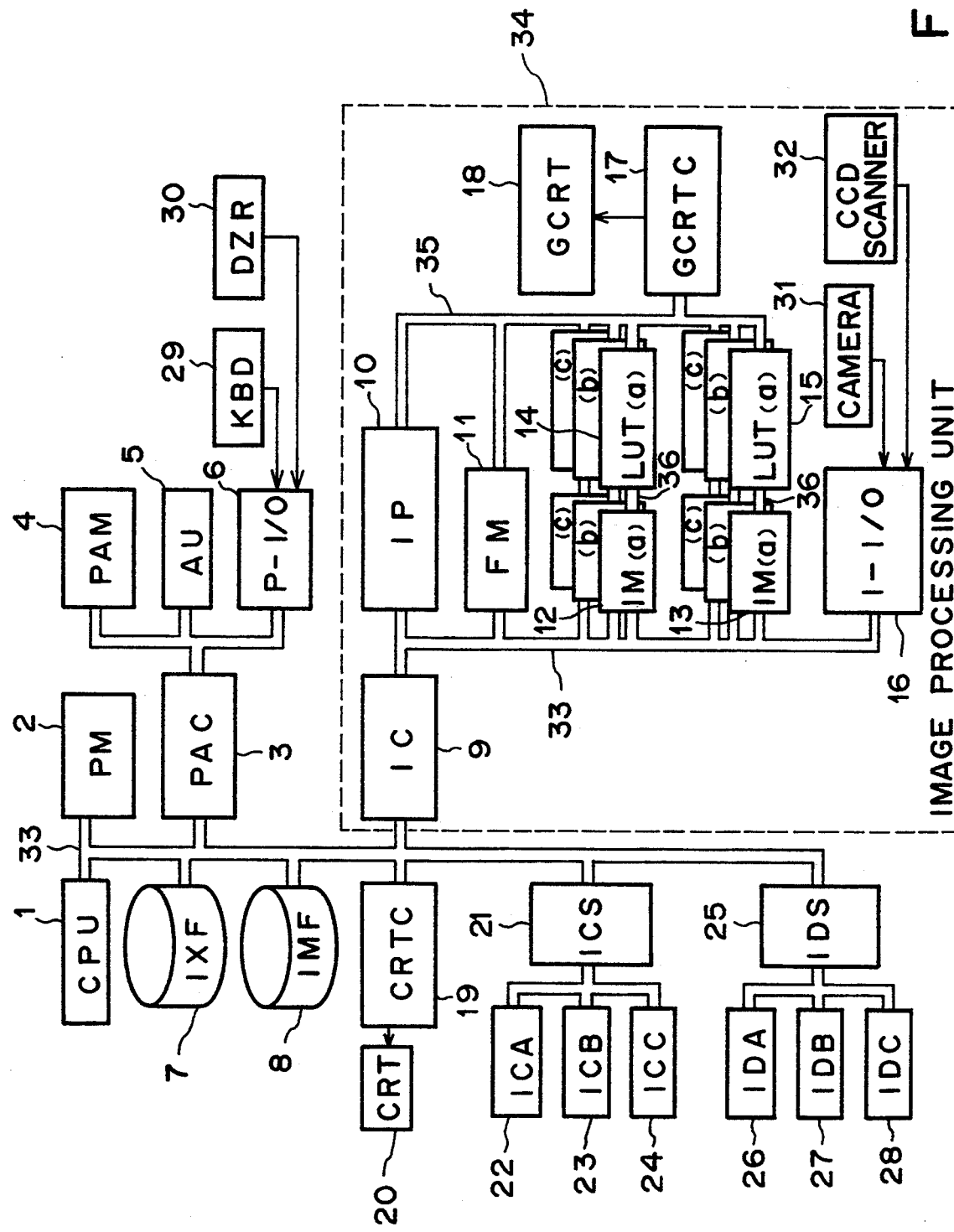
FIG. 1 is a block diagram of an image retrieval device in an embodiment of the present invention.

FIG. 1 is a block diagram of an image retrieval device of the embodiment. A control processor unit (CPU), denoted by 1, performs main control/processing of the entire image retrieval device. A program memory (PM), denoted by 2, stores, for example, image registration programs of FIGS. 5 and 8, which are performed by the CPU 1. A parameter controller (PAC), denoted by 3, controls initialization, setting and comparison operations of various kinds of parameters under the control of the CPU 1. A parameter memory (PAM), denoted by 4, stores various kinds of parameters (FIG. 6) necessary for the analysis of the type of an image. An arithmetic unit (AU), denoted by 5, performs a comparison operation between various kinds of parameters. A parameter setting I/O (P-I/O), denoted by 6, interfaces with the parameters set by the user. A keyboard (KBD), denoted by 29, and a digitizer (DZR), denoted by 30, each inputs commands and parameters such as the registration of images or retrieval requests via the P-I/O 6.

A CRT, denoted by 20, displays the contents of the menu at a parameter setting. The operator selects a parameter which he thinks most proper among the parameters displayed on the CRT 20 through the keyboard 29 or the digitizer 30. A CRT controller (CRTC), denoted by 19, controls the display of the CRT 20. An index file (IXF), denoted by 7, records identification codes and attribute data or the like used for the registration and retrieval of images. The input of attribute data is performed by a selection operation to the CRT 20 by using the keyboard 29 or the digitizer 30. The index file 7 is provided on a magnetic hard disk, for example. An image file (IMF), denoted by 8, records image data corresponding to the identification codes, attribute data, etc. registered in the index file 7. The image file 8 is provided on a magneto-optical recording medium, for example.

An image compressor (ICA), denoted by 22, is arranged to maximize its data compression ratio by a vector quantization method on image data which has a small number of colors, such as a sketch image. An image decompressor A (IDA), denoted by 26, in a pair relationship with the above-mentioned image compressor A, restores original image data by an algorithm the reverse of the image compressor A. An image compressor B (ICB), denoted by 23, is arranged to maximize its data compression ratio on a natural image like a photograph by an information-non-preserving type of encoding method. For instance, in this embodiment, original image data of the R, G and B coordinate system is converted into image data of the Y, I and Q system and those data of the R, G and B system of 8 bits each are compressed into image data of Y (8 bits), I (5 bits) and Q (5 bits). An image decompressor B (ICB), denoted by 27, in a pair relationship with the above-mentioned image compressor B, restores original image data by an algorithm the reverse of the image compressor B. Both the image compressor B and the image decompressor B may be arranged to maximize their data compression ratio according to the vector quantization method. An image compressor C (ICC), denoted by 24, is arranged to maximize its data compression ratio by an information preserving type of encoding method, such as a run length method on images such as characters, figures and so on. An image decompressor C (IDC), denoted by 28, in a pair relationship with the above-mentioned image compressor C, restores original image data by an algorithm reverse to that of the image compressor C. An image compressor switching means (ICS), denoted by 21, selects any one of the above-mentioned image compressors A to C under the control of the CPU 1. An image decompressor switching means (IDS), denoted by 25, selects any one of the above-mentioned image decompressors A to C similarly under the control of the CPU 1. In this way, the CPU 1 controls the switching so that those images compressed by the compressor A are restored by the decompressor A, those images compressed by the compressor B are restored by the decompressor B, and those compressed by the compressor C are restored by the decompressor C.

An image processing section, denoted by 34, performs processes other than the compression and decompression of image data. In the image processing section, an image processor (IP), denoted by 10, performs a nucleus processing. The image processor 10 is connected with the CPU 1 via an image controller (IC) 9 and a CPU bus 33, and receives image data from image memories (IM) 12 and 13 to be mentioned later or from an image reading device to be mentioned later via an image data I/O (I-I/O) 16 to be mentioned later, following instructions from the CPU 1, and performs various kinds of arithmetic operation processes. The image processor 10 performs, among each planes 12a, 12b and 12c of image memories 12 and 13, or between these memories and arbitrary constant, four rule operations, logic operations, maximum value/minimum value operations or the like. For example, the image processor detects the maximum value and the minimum value among the R, G and B data for each picture element to determine the difference between these values, or converts R, G and B data into image data of other dimensions (e.g., an H, L and S coordinate system, a Y, I and Q coordinate system, etc.), the operation result of which is stored in the image memories 12 and 13. The image memories 12 and 13 are made up of frame (plane) structures (a), (b) and (c) of three channels (e.g., R, G and B, or H, L and S, etc.) and connected to both the CPU bus 33 and a video bus 36. The CPU 1 can read and write from and to the image memories 12 and 13, and the image processor 10 can perform arithmetic operations of image data between any image memories.

A flag map memory (FM), denoted by 11, stores the contents of flags created after various kinds of arithmetic operations are performed on image data of the image memories 12 and 13 at addressees corresponding to the image memories 12 and 13. The flag map memory 11 has the same address space as those of respective planes 12a, 12b and 12c of the image memories 12 and 13, and statistical arithmetic operations (histogram arithmetic operations, etc.) of image data can be performed at high speed due to the presence of the flag map memory 11.

Look-up tables (LUT), denoted by 14 and 15, are composed of high speed RAMs. The inputs of which are connected to the video bus 36 side of the image memories 12 and 13. Respective frame memories (a), (b) and (c) of the look-up tables 14 and 15 have an address space of (8 bits×256) each. Addresses input to respective frame memories (a), (b) and (c) of the look-up tables 14 and 15 are each an 8-bit (256 gradations) output from the planes (a), (b) and (c) of the corresponding image memories 12 and 13 respectively. The output data line of respective frame memories (a), (b) and (c) of the look-up tables 14 and 15 is connected to a video bus 35. The CPU 1 can freely read and write the contents of the look-up tables 14 and 15 via the image controller 9 and the image processor 10.

A graphic controller (GCRTC), denoted by 17, controls the display of video data on the video bus 35. A graphic CRT (GCRT), denoted by 18, displays video data which is output from the graphic controller 17. And an image data I/O (I-I/O), denoted by 16, interfaces the input of image data from a three-tube type camera 31 or a color CCD scanner 32 which are image input devices.

In the above structure, at the time the image data is to be registered, original image data read onto the image memory 12 or 13 are statistically analyzed and image compressor corresponding to the type of the image is automatically selected. And the ID code of the image compressor selected is included in the attribute data of the index file 7 and registered, and the image data on which data compression is performed is written in the image file 8.

At the time the registered image data is to be retrieved, the ID code of the image compressor is read out from the attribute data of the index file 7 and the image decompressor corresponding to the ID code is automatically selected. As a result, the image data of the image file 8 is restored by the selected image decompressor and displayed on the graphic CRT 18.

Figure 2:
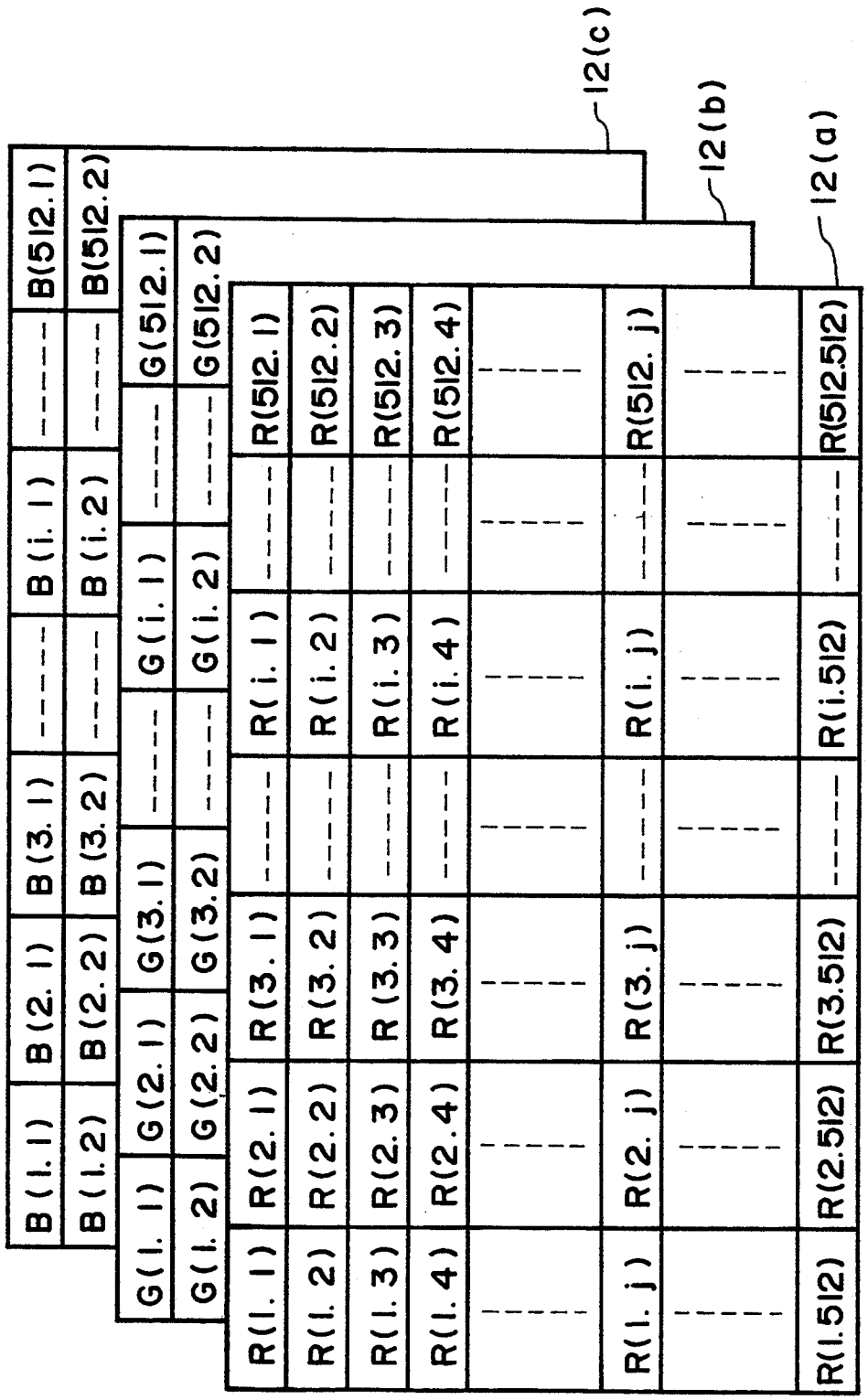
FIG. 2 is a view illustrating the image data storage structure of the image memory 12 in the embodiment.

FIG. 2 shows the image data storage structure of the image memory 12 in the embodiment. In this figure, R (i, j), G (i, j) and B (i, j) indicate image data of R, G and B of address (i, j) respectively. The R, G and B image data are 8 bits each and can represent 256 gradations from 0 to 255. The address (i, j) ranges from (1, 1) to (512, 512), and the size of one image is (512×512) picture elements and as is true of the image memory 13.

Figure 3A:
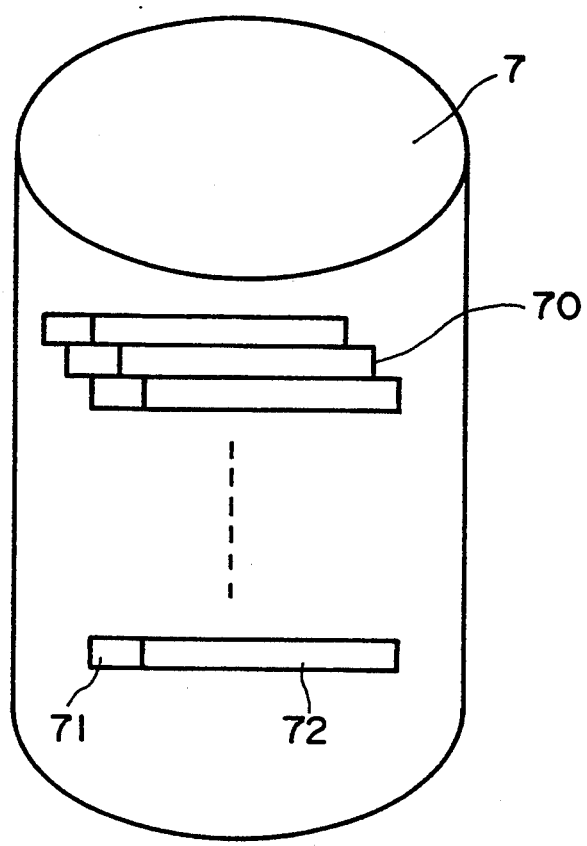
FIG. 3(A) is a view illustrating the data storage structure of the index file 7 in the embodiment.

FIG. 3 (A) is a view illustrating the data storage structure of the index file 7 of the embodiment. At the time of registering image data, original image data which is input from the three-tube type camera 31 or the CCD scanner 32 is stored in the image memory 12 or 13 and displayed on the graphic CRT 18. The operator looks at this displayed image, inputs a title and a comment about the image through a keyboard 29, and inputs attribute data of the image through the digitizer 30. The CPU 1 generates an identification code 71 of the image from this input data. The CPU 1 also instructs the image processing section 34 to perform a statistical processing on the basis of a color separation signal of the image and to include the characteristics (equivalent to the ID codes of the compressor and the decompressor) of the image obtained from the result in the above-mentioned attribute data. The identification code 71 and the attribute data 72 thus obtained constitute one record 70 and are registered in the index file 7 as a pair indicating the location of the respective image.

Figure 3B:
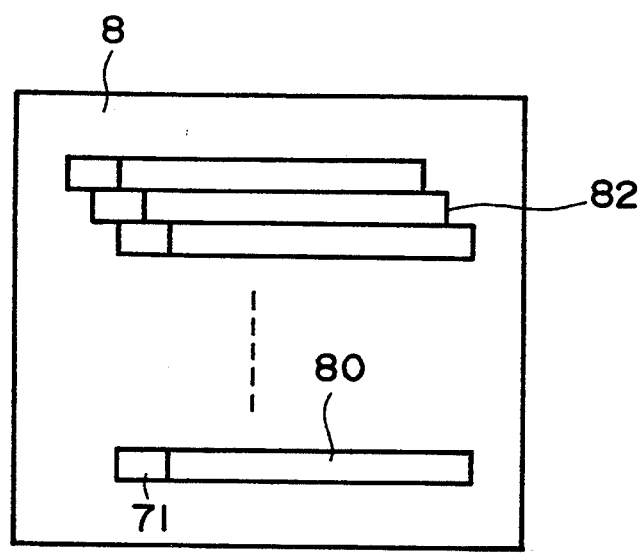
FIG. 3(B) is a view illustrating the data storage structure of the image file 8 in the embodiment.

FIG. 3(B) is a view illustrating the data storage structure of the image file 8 in the embodiment. An identification code, denoted by 71, corresponds to the identification code of the index file 7. An image data, denoted by 80, is the image data in which original image data is compressed by an image compressor selected. The identification code 71 and the image data 80 constitute a data file 82 indicating the location of the image data as a pair.

Figure 4:
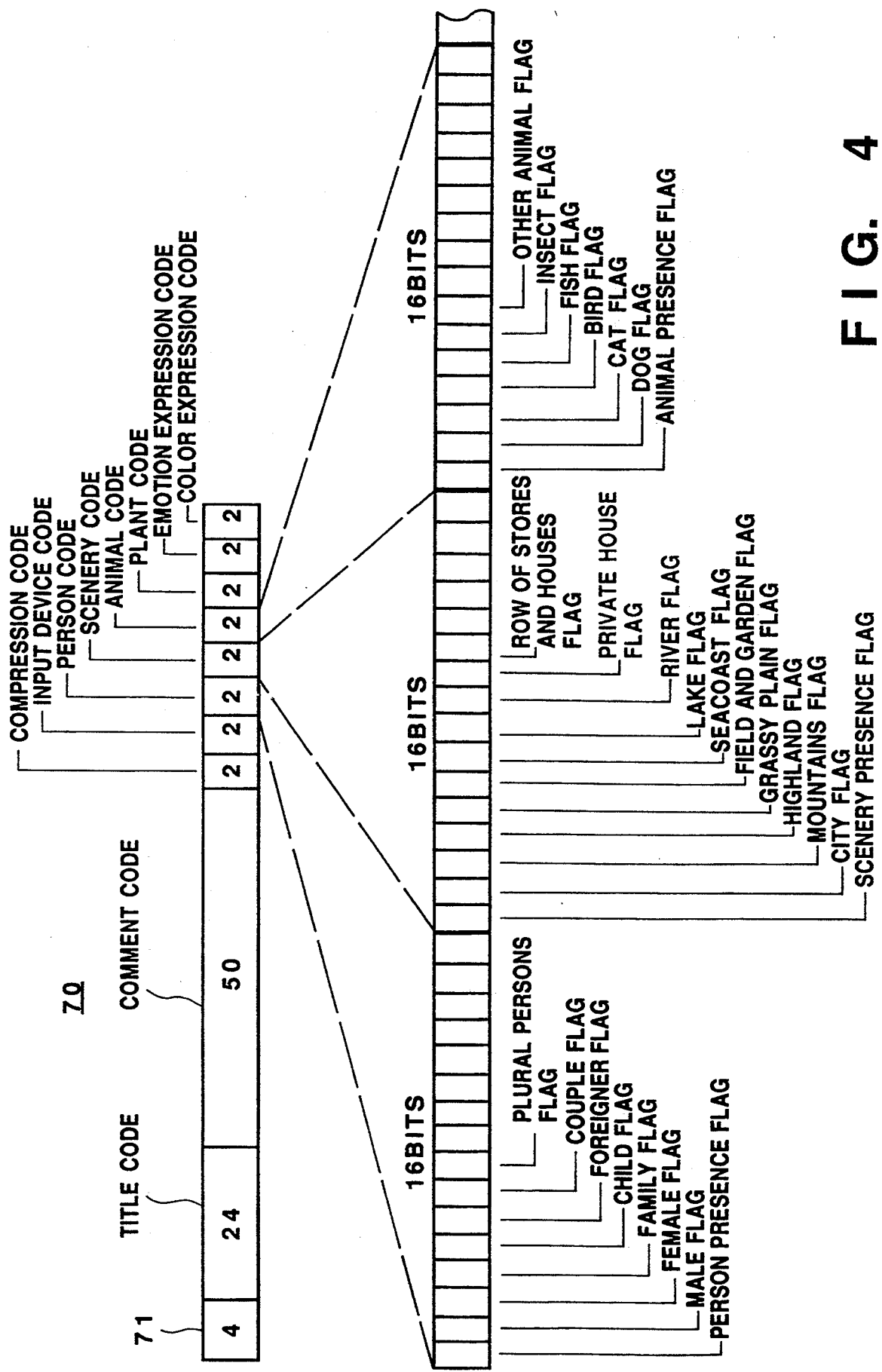
FIG. 4 is a view illustrating the storage format of the record 70 in the embodiment.

FIG. 4 is a view illustrating the storage format of the record 70 in the embodiment. The record 70 is comprised of a total of 94 bytes. Its components are the identification code 71 (4 bytes), a title record (24 bytes), and a comment code (50 bytes). The record 70 also includes a compression code, an input device code, a person code, a scenery code, an animal code, a plant code, an emotion expression code, and a color expression code, each of which is 2 bytes in length. In the title code and the comment code columns is written a character code which is input through the keyboard 29 by the operator. In the compression code column is written attribute data (an ID code equivalent to the I/O address of an image compressor selected, etc.) of the result obtained from the analysis of the original image data by the CPU 1 and the image processing section 34. In this embodiment, the lower-order three bits are used as the compression code, and the rest is left unused. Of the lower-order three bits, the first bit of the lowest order represents the pair of the image compressor A and the image decompressor A; the lower-order second bit represents the pair of the image compressor B and the image decompressor B; the lower-order third bit represents the pair of the image compressor C and the image decompressor C. That is, the lower-order three bits of the compression code are "001" in the case of the selection "A" "010" in the case of the selection "B" and "100" in the case of the selection "C".

In this embodiment, the selection "A" for the image compressor indicates a sketch image, "B" a photograph image, and "C" a character image. As mentioned above, the information in the compression code column is shared for the purposes of switching between the image compressor and the image decompressor, and of discriminating from among the different types of images, making the so-called key word retrieval easy.

Two bytes (16 bits) each are allocated to a person code, a scenery code, an animal code, a plant code, an emotion expression code, a color expression code and so on. The presence of respective attributes is stored in each bit, as shown in FIG. 4. The highest-order bit of each code is a presence flag indicating whether or not attribute information exists for the codes from person to scenery, allowing a quicker flag analysis. In the remaining 15 bits of each code are provided 15 kinds of attribute flags. The concept of various kinds of attributes corresponds to attribute flag bits, as shown in FIG. 4. For example, when the attributes pertaining to "person" are "child" and "female," the attribute code is '1010100000000000'. The latter half of 8 bits in the second byte of the person byte are vacant for future increases. The above method can be applied to the scenery code through the color expression code.

Figure 5:
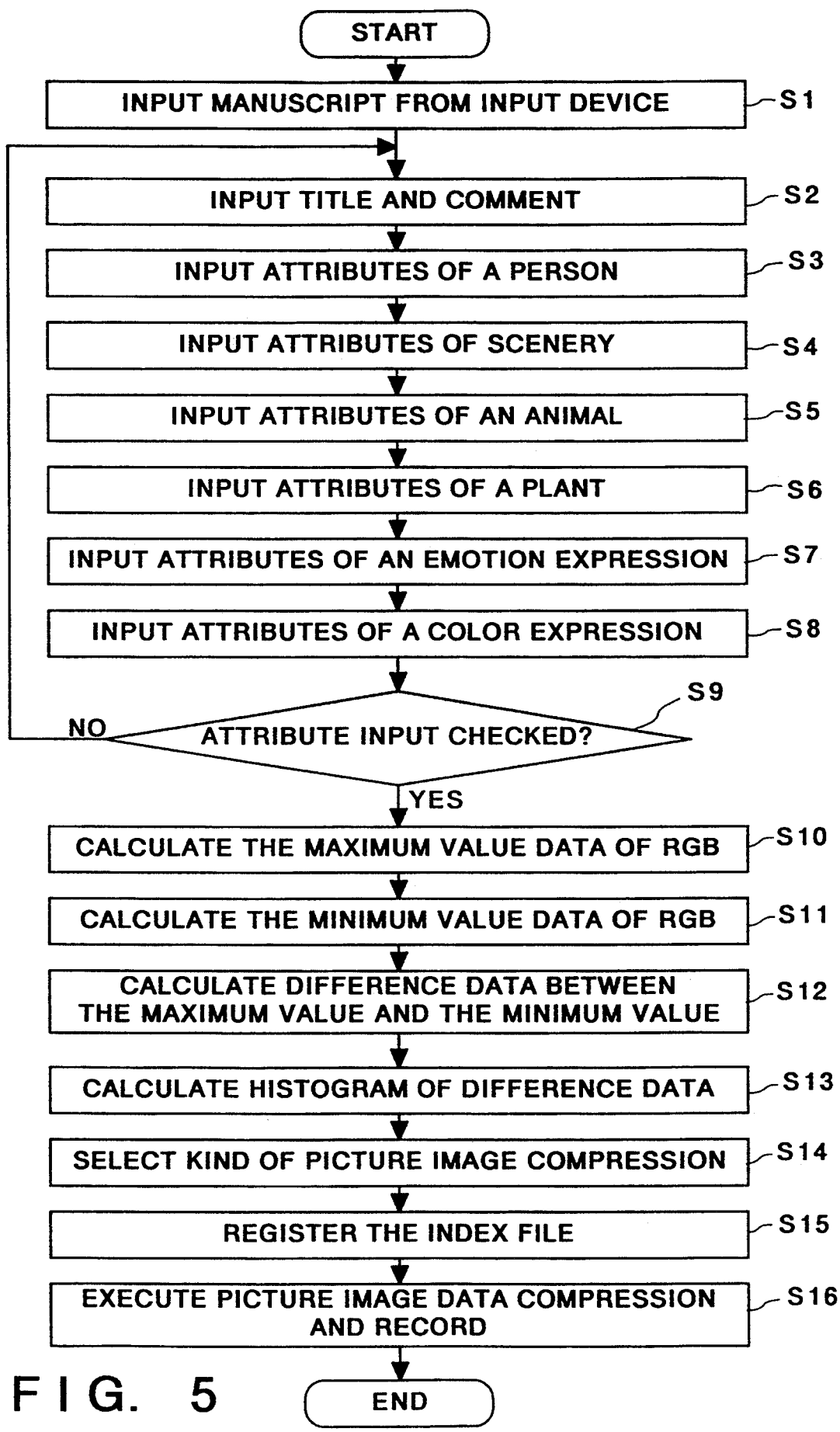
FIG. 5 is a flowchart of the image registration processing procedure in the embodiment.

FIG. 5 is a flowchart of the image registration processing procedure in the embodiment. It is assumed that an input image is "a female child and a dog are photographed together on a grassy plain, and the scene as a whole is bright". It follows that the following six types of attribute codes exist for this scene: "person", "scenery", "animal", "plant", "emotion expression", and "color expression". This case will be explained below.

(Step S1)

Original image data is input through the image data I/O 16. To describe this image input procedure in detail, first, the type of image input device is displayed on the CRT 20 by icon or the like, and the operator points to a desired icon with the keyboard 29 or the digitizer 30. As a result of this, the input flag 40 (not shown) in the parameter memory 4 is set at "0" if the three-tube type camera 31 is selected, for example, and at "1" if the CCD scanner 32 is selected. The CPU 1 gives an instruction to the image processor 10. The image processor 10 reads in original image data from an instructed image input device via the image data I/O 16 and stores it in the respective image memories 12(a), 12(b) and 12(c) for each of R, G and B data.

(Step S2)

The operator inputs a title and comment for the input image data. That is, a request for the input of the title and comment for the image is displayed on the CRT 20. The operator inputs the title and comment from the keyboard 29 by looking at the graphic CRT 18 on which R, G and B image data from the image memory 12 are being displayed. A title is 24 characters maximum in length, and a comment is 50 characters maximum in length.

(Step S3)

Attribute data on "person" is input. That is, first, attributes on "person", for example, "male", "female", "family", "child", "foreigner", "couple", "plural persons" and so on are displayed on the CRT 20. The operator conceptually extracts corresponding attributes by looking at the image on the graphic CRT 18 and selects and inputs corresponding attributes through the keyboard 29 or the digitizer 30. A plurality of attributes may be selected, or no selection may be made. In this embodiment, "female" and "child" are selected.

(Step S4)

In the same manner as in step S3, attribute data on "scenery" are input. In this embodiment, "grassy plain" is selected and input.

(Step S5)

Attribute data on "animal" is input. In this embodiment, "dog" is selected and input.

(Step S6)

Attribute data on "plant" is input. In this embodiment, "weed" (not shown) is selected and input.

(Step S7)

Attribute data on "emotion expression" which the operator has felt is input. In this embodiment, "bright scene as a whole" (not shown) is selected and input.

(Step S8)

Attribute data on "color expression" is input. In this embodiment, "green," "blue," "yellow" and "brown" (not shown) is selected and input.

(Step S9)

The above-mentioned attribute input is checked. That is, all input attributes are displayed on the CRT 20 and the operator checks them. In the case of "good," the operator instructs the system to proceed to (step S10). In a case where the operator wants to change them, he instructs the system to return to the former (step S2). When the system returns to (step S2), attribute data can be input again.

(Step S10)

A maximum value MAX {R (i, j), G (i, j), B (i, j)} is determined for each picture element from the R, G and B original image data of the image memory 12. That is, first, the image processor 10 compares the R data of the plane 12(a) and the G data of the plane 12(b) with each other for each picture element and stores respective greater ones in the plane 13(a) of the image memory 13. Next, image data of the plane 13(a) and the B data of the plane 12(c) are compared with each other for each picture element, and respective greater ones are stored in the plane 13(b) of the image memory 13. As a result of this, it follows that the plane 13(b) of the image memory 13 holds respective maximum values of each picture element of the R, G and B image data.

(Step S11)

A minimum value MIN {R (i, j), G (i, j), B (i, j)} is determined for each picture element from the R, G and B original image data of the image memory 12. That is, first, the image processor 10 compares the R data of the plane 12(a) and the G data of the plane 12(b) with each other for each picture element and stores respective smaller ones in the plane 13(a) of the image memory 13. Next, image data of the plane 13(a) and the B data of the plane 12(c) are compared at units of picture element, and respective smaller ones are stored in the plane 13(c) of the image memory 13. As a result of this, it follows that the plane 13(c) of the image memory 13 holds respective minimum values of each picture element of the R, G and B image data.

(Step S12)

The difference between respective maximum values and respective minimum values of each picture element which are obtained for the R, G and B original image data is determined. That is, the difference between respective maximum values of the plane 13(b) of the image memory 13 and respective minimum values of the plane 13(c) of the image memory 13 is obtained for each picture element, and this difference is written in the plane 13(a) of the image memory 13.

(Step S13)

Figure 6:
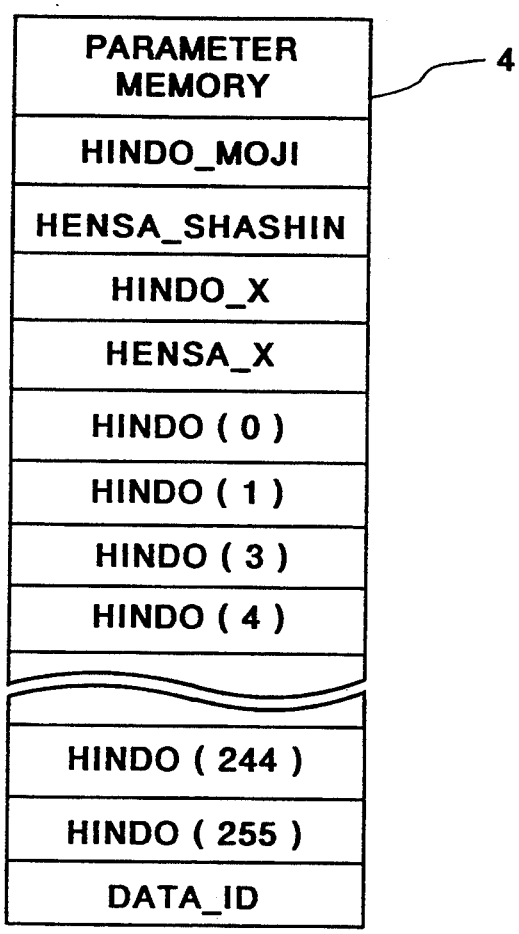
FIG. 6 is a view illustrating a portion of the storage structure of the parameter memory 4 in the embodiment.

A histogram (a distribution indicating what number of the values of the difference data 0 to 255 there are) is determined for the difference data (plane 13(a)) mentioned above, the results of which are stored in the parameter memory 4 (FIG. 6). Specifically, the CPU 1 reads in the difference data of the plane 13(a) in turn, sets a flag to "1" at a corresponding address of the flag map memory 11 when the difference data is "0" and sets the flag to "0" when the difference data is not "0". Next, the number of the difference data (="0") is counted for this one image, the result of which is stored in an area of HINDO (0) of the parameter memory 4. Next, the same calculation is made for the difference data (="1"), and the number of the difference data (="1") is stored in an area of the HINDO (1). Similarly, HINDO (2) to HINDO (255) are written.

The values of the difference data may be analyzed at intervals, for instance, 10 as in the following. That is, at first, the number of difference data (="0" to "9") is determined. Next, the number of difference data (="10" to "19") is determined. In this way, the histogram can be stored in a small area of HINDO (0) to HINDO (25).

(Step S14)

A method of compressing original image data (a pair of the compressor/decompressor A to C) is selected. For this, first, the type of the image are judged on the basis of the statistical calculation value in step S13 for the original image data.

Figures 7A, 7B, 7C:
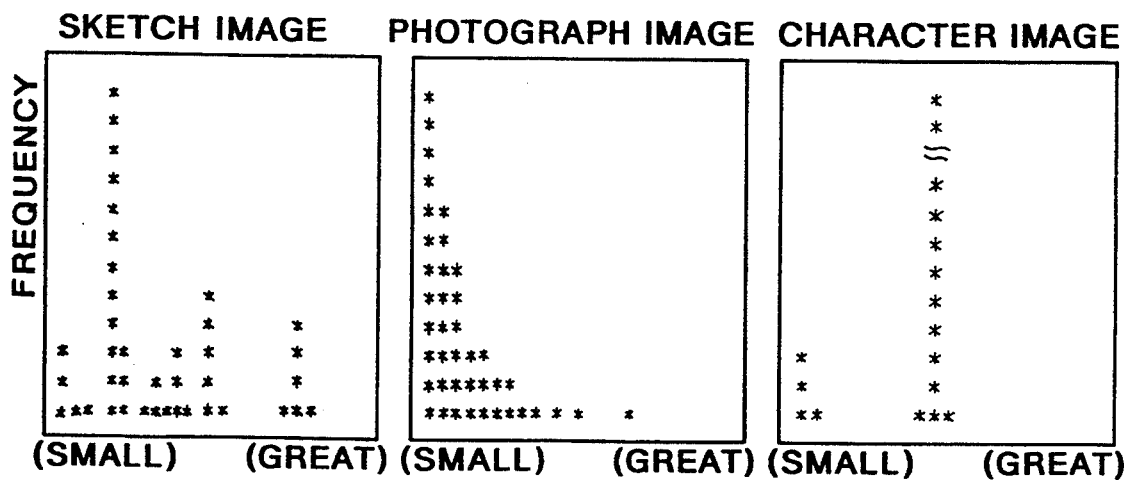
FIGS. 7(A) to 7(C) are views illustrating the histograms of difference data obtained for each type of image in the embodiment.

FIGS. 7(A) to 7(C) are views showing the histograms of difference data determined for each image of the embodiment. In the figures, the horizontal axis indicates the difference data 0 to 255 at intervals of 10. The vertical axis indicates the frequency of the sum of the numbers at each section.

FIG. 7(A) is a histogram of a sketch image. A sketch image has a smaller number of colors than a photograph image. Therefore, its tone of color is distinct and a histogram of discrete colors is obtained, as shown in the figure.

FIG. 7(B) is a histogram of a photograph image. A photograph image has a great number of colors, and its histogram becomes a Gauss-wise distribution of colors, as shown in the figure.

FIG. 7(C) is a histogram of a character image. A character image consists of a basement color and a character color and has high monochromaticity. For this reason, as shown in the figure, a histogram which is extremely great in a certain frequency appears.

Figure 8:
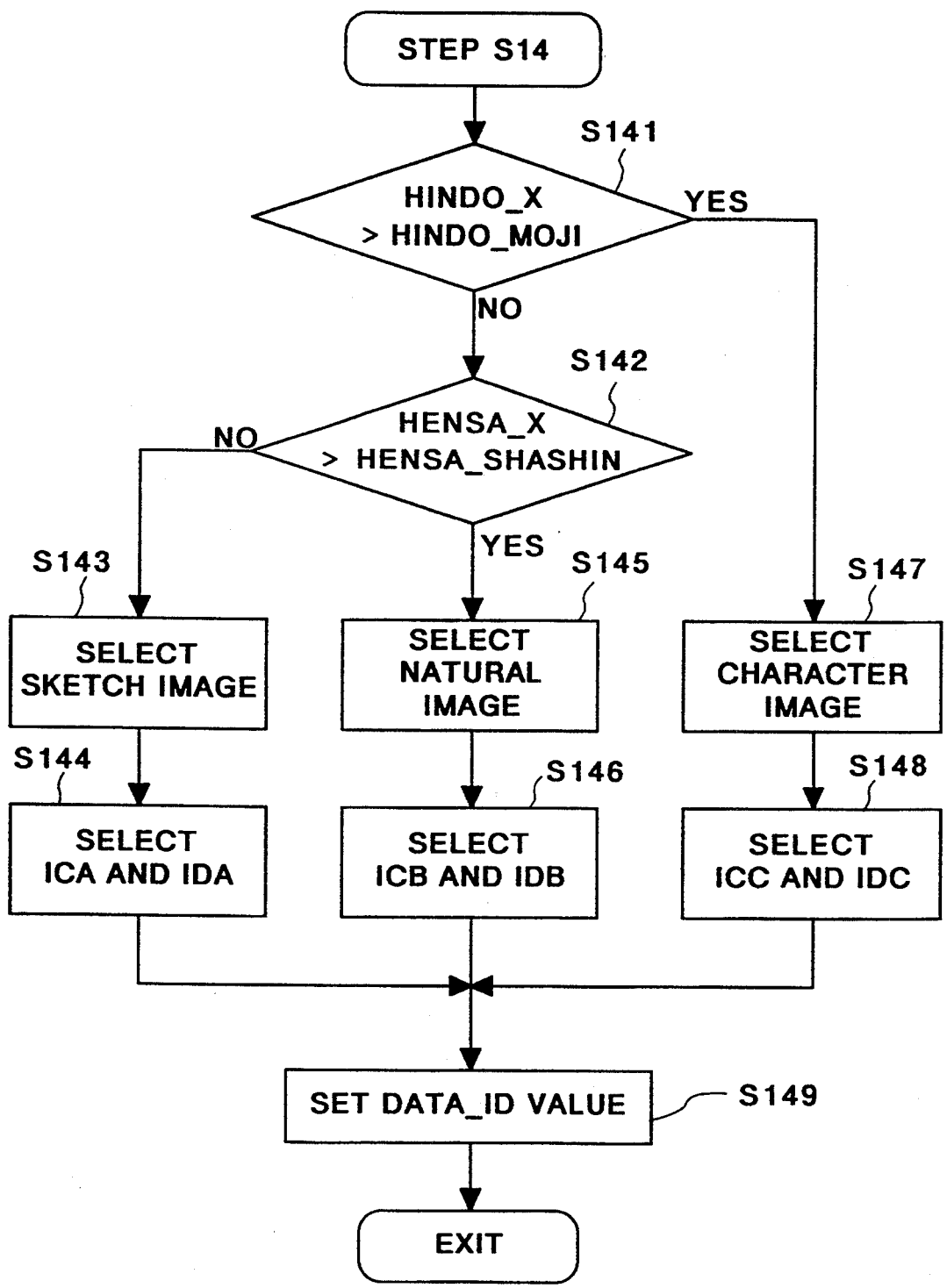
FIG. 8 is a flowchart illustrating the details of step S14 of FIG. 5.
Figure 9:
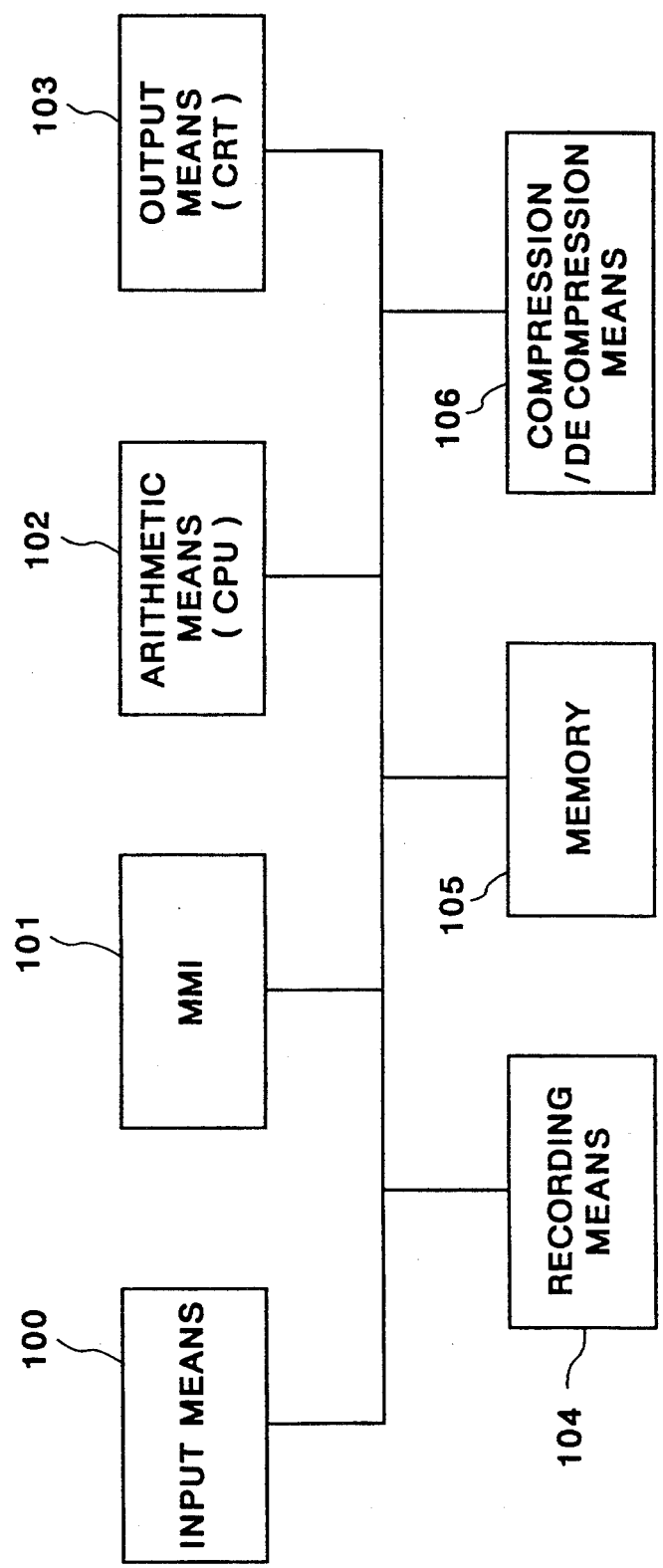
FIG. 9 is a block diagram of the conventional image retrieval system.

FIG. 8 is a flowchart illustrating the details of step S14 of the embodiment. In the figure, first, the CPU 1 finds respective sums by adding HINDO (0) to HINDO (255) at intervals of 10. Next, it finds the maximum value from the added value and stores it in the HINDO-X. In step S141, it is judged to see whether or not (HINDO-X)>(HINDO-MOJI). Here, the HINDO-MOJI is a predetermined value capable of identifying a character image, and in this embodiment, it is 240000 equivalent to about 91.5% of (512×512) picture elements.

In the case of (HINDO-X)>(HINDO-MOJI), the system proceeds to step S147 where a character image is selected. In step S148, the pair of the compressor C and the decompressor C is selected. When (HINDO-X)>(HINDO-MOJI) is not met, the system proceeds to step S142 where a judgment of whether or not (HENSA-X)>(HENSA-SHASIN) is made, in which HENSA-X is a standard deviation determined from the above-mentioned histogram by the CPU 1. In this embodiment, the average value of the frequency is set at "0". The HENSA-SHASIN is a predetermined value (40, for instance) capable of distinguishing between a sketch image and a natural image.

When (HENSA-X)>(HENSA-SHASIN), the system proceeds to step S145, a natural image is selected. In step S146 where the pair of the compressor B and the decompressor B is selected. When (HENSA-X)>(HENSA-SHASIN) is not met, the system proceeds to step S143 where a sketch image is selected. In step S144, a pair of the compressor A and the decompressor A is selected. This judgment based on the maximum value and the standard deviation of the frequency is relatively easily performed, and its image identification accuracy is very high. Thus, the type of an image is automatically identified. The types of a compressor and an decompressor are selected. These information is stored in the DATA-ID of the parameter memory 4.

(Step S15)

Referring back to FIG. 5, in step S15, the CPU 1 creates the identification code 71, adds the attribute data to this code, and creates the record 70 as a whole, being registered in the index file 7. The attribute data includes the information of DATA-ID. Thus, the operator can operate without being conscious of a compressor and a decompressor in actual use.

(Step S16)

Under the instructions of the CPU 1, the image processor 10 compresses the R, G and B original image data of the image memory 12 by an image compressor selected, adds the identification code 71 to the head of the resulting image data, and registers it in the image file 8.

In the above-mentioned embodiment, processings involving the setting of attribute data, the calculation of statistical data of an image and so on are performed in the form of software. It goes without saying that these are performed in the form of hardware.

In the above-mentioned embodiment, one type of image compressor and one type of image decompressor are selected for one image. However, it is not limited to this selection. For example, if the image area separation technology is introduced, an optimal image compressor and an optimal image decompressor can be selected for a plurality of areas of one image.

As set forth hereinabove, according to the present invention, image processing of a high compression and decompression ratio can be performed at all times for various kinds of color images.

According to the present invention, also, a color character image having high monochromaticity and a color image other than that can excellently be identified. A color natural image of a Gauss-wise distribution and a color illustration image which is somewhat more discrete than that can excellently be identified.

As many apparently widely different embodiments of the present invention can be made without departing from the spirit and scope thereof, it is to be understood that this invention is not limited to the specific embodiments thereof except as defined in the appended claims.

What is claimed is:

1. An image processing device comprising:
   input means for inputting a plurality of color component signals representing a color image;
   identification means for identifying a type of the color image on the basis of the plurality of color component signals from said input means;

first compression means for compressing the color component signals from said input means by using an information-preserving-type of encoding method;

second compression means for compressing the color component signals from said input means by using an information-non-preserving-type of encoding method;

selection means for selecting one of said first and second compression means in accordance with the type of the color image identified by said identification means; and storage means for storing compressed color component signals from said first or second compression means together with identification data representing the type of the color image identified by said identification means.

2. An image processing device according claim 1, further comprising addition means for adding the identification data to the compressed color component signals.

3. An image processing device according to claim 2, wherein said storage means stores the compressed color component signals to which the identification data is added.

4. An image processing device according to claim 1, further comprising decompression means for decompressing the compressed color component signals stored in said storage means.

5. An image processing device according to claim 4, wherein said decompression means has a plurality of different types of decompression algorithms, and said decompression means decompresses the compressed color component signals by using a decompression algorithm which is selected in accordance with the identification data associated with the compressed color component signals.

6. An image processing device according to claim 1, wherein said identification means identifies the type of the color image on the basis of a histogram of frequency of the color component signals.

7. An image processing device according to claim 1, wherein said information-non-preserving-type of encoding method is a vector quantization method.

8. An image processing device comprising:
input means for inputting a plurality of color component signals representing a color image;
identification means for identifying a type of the color image on the basis of the plurality of color component signals from said input means;
first compression means for compressing the color component signals from said input means by using an information-preserving-type of encoding method;
second compression means for compressing the color component signals from said input means by using an information-non-preserving-type of encoding method;
selection means for selecting one of said first and second compression means in accordance with the type of the color image identified by said identification means;
storage means for storing compressed color component signals from said first or second compression means together with identification data representing the type of the color image identified by said identification means; and decompression means for decompressing the compressed color component signals stored in said storage means in accordance with the identification data.

9. An image processing device according to claim 8, further comprising addition means for adding the identification data to the compressed color component signals.

10. An image processing device according to claim 9, wherein said storage means stores the compressed color component signals to which the identification data is added.

11. An image processing device according to claim 8, wherein said decompression means has a plurality of different types of decompression algorithms, and said decompression means decompresses the compressed color component signals by using any one of the decompression algorithm which is selected in accordance with the identification data associated with the compressed color component signals.

12. An image processing device according to claim 8, wherein said identification means identifies the type of the color image on the basis of a histogram of frequency of the color component signals.

13. An image processing device according to claim 8, wherein said information-preserving-type of encoding method is a run length encoding method.

14. An image processing device according to claim 8, wherein said information-non-preserving-type of encoding method is a vector quantization method.

15. An image processing method comprising the steps of:
inputting a plurality of color component signals representing a color image;
identifying a type of the color image on the basis of the plurality of color component signals;
selecting one of an information-preserving-type of encoding method and an information-non-preserving-type of encoding method in accordance with the type of the color image identified in said identifying step;
compressing the color component signals by using the selected encoding method; and
storing the compressed color component signals in a memory together with identification data representing the type of the color image identified in said identifying step.

16. An image processing method according to claim 15, wherein said information-preserving-type of encoding method is a run length encoding method.

17. An image processing method according to claim 15, wherein said information-non-preserving-type of encoding method is a vector quantization method.

18. An image processing method comprising the steps of:
inputting a plurality of color component signals representing a color image;
identifying a type of the color image on the basis of the plurality of color component signals;
selecting one of an information-preserving-type of encoding method and an information-non-preserving type of encoding method in accordance with the type of the color image identified by said identifying step;
compressing the color component signals by using the selected encoding method;
storing the compressed color component signals in a memory together with identification data representing the type of the color image identified by said identifying step; and decompressing the compressed color component signals stored in said memory in accordance with the identification data.

19. An image processing device according to claim 1, wherein said information-preserving-type of encoding method is a run length encoding method.

20. An image processing method according to claim 18, wherein said information-preserving-type of encoding method is a run length encoding method.

21. An image processing method according to claim 18, wherein said information-non-preserving-type of encoding method is a vector quantization method.

* * * * *